(12) United States Patent
Schafheutle et al.

(10) Patent No.: US 7,393,894 B2
(45) Date of Patent: Jul. 1, 2008

(54) SELF-CROSSLINKING AQUEOUS POLYURETHANE DISPERSIONS

(75) Inventors: Markus Schafheutle, Graz (AT); Anton Arzt, Neutillmitsch (AT); Julius Burkl, Graz (AT); Gudrun Garber, St. Josef (AT); Hannelore Gsöll, Graz (AT); Rudolf Jedlicka, Wiener Neustadt (AT); Susanne Neumayer, Graz (AT); Gerlinde Petritsch, Graz (AT); Renate Pittermann, St. Margarethen/Raab (AT); Jörg Wango, Wundschuh (AT)

(73) Assignee: Cytec Surface Specialties Austria GmbH (AT)

( * ) Notice: Subject to any disclaimer, the term of this patent is extended or adjusted under 35 U.S.C. 154(b) by 0 days.

(21) Appl. No.: 10/560,302

(22) PCT Filed: Jun. 3, 2004

(86) PCT No.: PCT/EP2004/005992

§ 371 (c)(1),
(2), (4) Date: Dec. 12, 2005

(87) PCT Pub. No.: WO2004/111103

PCT Pub. Date: Dec. 23, 2004

(65) Prior Publication Data

US 2007/0093594 A1    Apr. 26, 2007

(30) Foreign Application Priority Data

Jun. 13, 2003  (AT) .............................. A 926/2003

(51) Int. Cl.
*C08J 3/00*     (2006.01)
*C08K 3/20*     (2006.01)
*C08L 75/00*    (2006.01)

(52) U.S. Cl. .................. 524/591; 524/839; 524/840
(58) Field of Classification Search ................ 524/591, 524/839, 840
See application file for complete search history.

(56) References Cited

U.S. PATENT DOCUMENTS

| | | | |
|---|---|---|---|
| 3,124,605 A | 3/1964 | Wagner |
| 3,358,010 A | 12/1967 | Britain |
| 3,412,054 A | 11/1968 | Milligan et al. |
| 3,640,924 A | 2/1972 | Trimble et al. |
| 3,723,372 A | 3/1973 | Wakimoto et al. |
| 3,903,126 A | 9/1975 | Woemer et al. |
| 3,903,127 A | 9/1975 | Wagner et al. |
| 3,920,598 A | 11/1975 | Reiff et al. |
| 3,976,622 A | 8/1976 | Wagner et al. |
| 4,046,729 A | 9/1977 | Scriven et al. |
| 4,203,883 A | 5/1980 | Hangauer, Jr. |
| 4,240,938 A | 12/1980 | Kraft et al. |
| 4,314,918 A | 2/1982 | Birkmeyer et al. |
| 4,324,879 A | 4/1982 | Bock et al. |
| 4,331,573 A | 5/1982 | Zabrocki et al. |
| 4,543,376 A | 9/1985 | Schupp et al. |
| 4,885,392 A | 12/1989 | Lenz et al. |
| 4,983,662 A | 1/1991 | Overbeek et al. |
| 5,147,925 A | 9/1992 | Pears et al. |
| 5,147,926 A | 9/1992 | Meichsner et al. |
| 5,571,861 A | 11/1996 | Klein et al. |
| 5,623,016 A | 4/1997 | Klein et al. |
| 2002/0040093 A1* | 4/2002 | Hobel et al. ................. 524/555 |
| 2004/0236011 A1 | 11/2004 | Haeberle et al. |

FOREIGN PATENT DOCUMENTS

| | | | |
|---|---|---|---|
| CA | 2219835 | * | 5/1998 |
| DE | 2020 905 | | 2/1971 |
| DE | 23 14 513 | | 10/1974 |
| DE | 26 24 442 | | 12/1976 |
| DE | 27 44 544 | | 4/1978 |
| DE | 28 11 913 | | 2/1980 |
| DE | 29 28 552 | | 1/1981 |
| DE | 31 24 784 | | 4/1982 |
| DE | 36 44 371 | | 7/1988 |
| DE | 0 367 051 | | 5/1990 |
| DE | 196 18 675 | | 3/1997 |
| DE | 196 47 982 | | 5/1998 |
| DE | 101 27 208 | | 12/2002 |
| EP | 0 120 466 | | 10/1984 |
| EP | 0 649 865 | | 4/1995 |
| EP | 0 844 261 | | 5/1998 |
| WO | WO-02/14399 | | 2/2002 |

* cited by examiner

*Primary Examiner*—Patrick D Niland
(74) *Attorney, Agent, or Firm*—Connolly Bove Lodge & Hutz LLP

(57) ABSTRACT

The invention relates to self-crosslinking aqueous polyurethane dispersions containing a crosslinking agent I selected from diamones I1 and dihydrazides I2, and polyurethanes comprising structural elements derived from polyisocyanates A, polyols B having a number average molar mass $M_n$ of at least 400 g/mol, compounds D comprising at least two groups which are reactive compared to isocyanate groups and at least one group able to form anions, low-molecular polyols E that carry no other reactive groups compared to isocyanate groups, compounds F containing at least one group which is reactive compared to isocyanate, and at least one aldehyde-type or ketone-type carbonyl group, and compounds G that are monofunctional compared to isocyanates or contain active hydrogen with different capabilities of reaction and are different from the compounds E. The invention also relates to methods for the production of said dispersions, and coating agents containing the same.

10 Claims, No Drawings

SELF-CROSSLINKING AQUEOUS POLYURETHANE DISPERSIONS

RELATED APPLICATIONS

This application is a national stage application (under 35 U.S.C. 371) of PCT/EP2004/005992 filed Jun. 2, 2004 which claims benefit to Austrian application A 926/2003 filed Jun. 13, 2003.

FIELD OF THE INVENTION

The invention concerns self-crosslinking aqueous polyurethane dispersions.

BACKGROUND OF THE INVENTION

Aqueous polyurethane dispersions which are cured to form crosslinked paint films without the addition of curing agents such as polyfunctional isocyanates (at room temperature or slightly elevated temperature) or amino resins (conventionally at temperatures of over 100° C.) are already known from the literature. In EP-A 0 649 865 aqueous polyurethane dispersions are described which are functionalised by grafting with acrylic monomers containing ketone groups and which crosslink with dihydrazides such as adipic acid dihydrazide dissolved in the dispersion without addition of external curing agents. The drying behaviour of these dispersions is not yet satisfactory, however.

The object is to provide similar polyurethane dispersions which dry more quickly and exhibit an improved chemical resistance already after a short time.

The object is achieved by a self-crosslinking aqueous polyurethane dispersion containing polyurethane molecules having laterally or terminally bonded carbonyl groups.

SUMMARY OF THE INVENTION

The invention concerns aqueous dispersions of self-crosslinking polyurethanes containing structural units derived from polyisocyanates A, polyols B having a number-average molar mass $M_n$ of at least 400 g/mol, optionally low molar mass polyols C having a $M_n$ of less than 400 g/mol, compounds D having at least two groups which are reactive towards isocyanate groups and at least one group which is capable of anion formation, low molar mass polyols E carrying no further groups which are reactive towards isocyanate groups, compounds F containing at least one group which is reactive towards isocyanate and at least one aldehyde-like or ketone-like carbonyl group, compounds G which are monofunctional with respect to isocyanates or contain active hydrogen of differing reactivity and which differ from compounds E, and optionally compounds H, which differ from B, C, D, E, F and G and contain at least two groups which react with NCO groups.

The aqueous dispersions also contain a crosslinking agent I selected from the group consisting of diamines I1 and dihydrazides I2.

DETAILED DESCRIPTION OF THE PREFERRED EMBODIMENTS

The carbonyl groups are incorporated in compound F and are bound to the polymer chain in the polyurethane by means of a divalent group —X—, wherein the group —X— is preferably selected from the group consisting of linear and branched, and cyclic alkylene groups and aralkylene groups each having at least 2, preferably 3 to 20, carbon atoms, wherein the two binding sites must not be on the same C atom. The isocyanate-reactive group, selected from hydroxyl, amine and mercaptan groups, can be bound to an aromatic carbon atom (e.g. a phenolic hydroxyl group) or preferably to an aliphatic carbon atom.

The group —X— is preferably a 1,2-, 1,3- or 1,4-alkylene radical having the structure

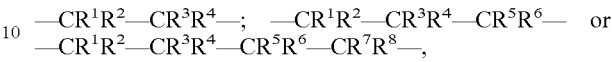

$-CR^1R^2-CR^3R^4-CR^5R^6-CR^7R^8-$, wherein the radicals $R^1$ to $R^8$ can be mutually different or the same and can also be bonded together in such a way that a cyclic structure is formed; linear structures are preferred, however, for example groups of the type $-CH_2-CH_2-$; $-CH_2-CH_2-CH_2-$ and $-CH_2-CH_2-CH_2-CH_2-$.

Preferred compounds F are therefore 1-(4-hydroxyphenyl)-3-butanone and in particular 3-acetyl-1-propanol, 2-acetyl-1-ethanol, 4-acetyl-1-butanol, 2,2-dimethyl-3-hydroxy-propionaldehyde and dihydro-5-hydroxymethyl-2(3H)-furanone.

$R^1$ to $R^8$ are selected from H—, —OH, alkyl having 1 to 4 C atoms, —O-alkyl having 1 to 4 C atoms and halogens.

As crosslinking agent I a diamine I1 and/or a dihydrazide I2 is added to the aqueous dispersion of the polyurethane.

The invention also concerns a process for preparing self-crosslinking, water-dispersible polyurethane resins, comprising the following steps:

synthesis of an isocyanate-functional prepolymer by reacting polyisocyanates A with polyols B having a number-average molar mass $M_n$ of at least 400 g/mol, optionally low molar mass polyols C, compounds F having a carbonyl group and compounds D having at least two groups that are reactive towards isocyanate groups and at least one group capable of anion formation, to form a prepolymer containing free NCO groups which has a Staudinger index $J_0$ of at least 11 cm$^3$/g, preferably at least 13 cm$^3$/g and particularly preferably at least 18 cm$^3$/g, at least partial neutralisation of the group in compound D that is capable of anion formation to form anionic groups, dispersion of this prepolymer in water and reaction of the neutralised prepolymer with at least one of the components selected from low molar mass polyols E carrying no further groups that are reactive towards isocyanate groups, these compounds being used in excess, compounds G which are monofunctional with respect to isocyanates or contain active hydrogen of differing reactivity and which differ from compounds E, and optionally compounds H, which differ from B, C, D, E, F and G and contain at least two groups which react with NCO groups, and addition of a crosslinking agent I selected from diamines I1 and dihydrazides I2.

The formerly so-called "limiting viscosity number", referred to in DIN 1342, Part 2.4 as the "Staudinger index", $J_0$, is the limiting value of the Staudinger function $J_V$ with decreasing concentration and shear stress, wherein $J_V$ is the relative change in viscosity divided by the mass concentration $\beta_B = m_B/V$ of the dissolved substance B (with mass $m_B$ of the substance in volume V of the solution), in other words $J_V = (\eta_r-1)/\beta_B$. Here $\eta_r-1$ denotes the relative change in viscosity according to $\eta_r-1 = (\eta-\eta_s)/\eta_s$. The relative viscosity $\eta_r$ is the quotient of the viscosity $\eta$ of the solution under investigation and the viscosity $\eta_s$ of the pure solvent. (The physical meaning of intrinsic viscosity is that of a specific hydrodynamic volume of the solvated polymer tangle at infinite dilution and at rest). The unit conventionally used for J is "cm$^3$/g"; frequently also "ml/g" or "dl/g".

The invention also concerns paints containing these self-crosslinking water-dilutable polyurethane resins as binders, wherein other binders can optionally additionally also be used in combination with these polyurethane resins, and coatings produced with these paints.

The isocyanates A are at least difunctional and can be selected from aromatic and aliphatic, linear, cyclic or branched isocyanates, in particular diisocyanates. If aromatic isocyanates are used, they are preferably used in combination with the cited aliphatic isocyanates. The proportion of aromatic isocyanates here is preferably chosen so that the number of isocyanate groups introduced by them into the mixture is at least 5% less than the number of isocyanate groups remaining after the first step in the prepolymer that was produced. Diisocyanates are preferred, wherein up to 5% of their mass can be replaced by trifunctional or polyfunctional isocyanates.

The diisocyanates preferably have the formula Q(NCO)$_2$, wherein Q stands for a hydrocarbon radical having 4 to 40 C atoms, in particular 4 to 20 C atoms, and preferably an aliphatic hydrocarbon radical having 4 to 12 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms. Examples of such diisocyanates as are preferably used are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate, IPDI), 4,4'-diisocyanatodicyclohexyl methane, 4,4'-diisocyanatodicyclohexyl propane-(2,2), 1,4-diisocyanatobenzene, 2,4- or 2,6-diisocyanatotoluene or mixtures of these isomers, 4,4'- or 2,4'-diisocyanatodiphenyl methane, 4,4'-diisocyanatodiphenyl propane-(2,2), p-xylylene diisocyanate and α,α,α',α'-tetramethyl-m- or p-xylylene diisocyanate and mixtures comprising these compounds.

In addition to these simple polyisocyanates, those containing hetero atoms in the radical connecting the isocyanate groups are also suitable. Examples thereof are polyisocyanates exhibiting carbodiimide groups, allophanate groups, isocyanurate groups, urethane groups, acylated urea groups or biuret groups. Reference is made by way of example to DE-A 29 28 552 with regard to further suitable polyisocyanates.

Also suitable are "paint polyisocyanates" based on hexamethylene diisocyanate or 1-isocyanato-3,3,5-trimethyl-4-isocyanatomethyl cyclohexane (IPDI) and/or bis(isocyanatocyclohexyl)methane, particularly those based exclusively on hexamethylene diisocyanate. "Paint polyisocyanates" based on these diisocyanates are understood to be the derivatives of these diisocyanates known per se exhibiting biuret, urethane, uretdione and/or isocyanurate groups, which following their preparation have been freed if necessary from excess initial diisocyanate in a known manner, preferably by distillation, down to a residual mass fraction of less than 0.5%. The preferred aliphatic polyisocyanates for use according to the invention include polyisocyanates based on hexamethylene diisocyanate which meet the aforementioned criteria and have biuret groups, as can be obtained for example by the methods described in U.S. Pat. Nos. 3,124,605, 3,358,010, 3,903,126, 3,903,127 or 3,976,622, and which consist of mixtures of N,N,N-tris-(6-isocyanatohexyl)biuret with secondary amounts of its higher homologues, and the cyclic trimers of hexamethylene diisocyanate which correspond to the aforementioned criteria, as can be obtained according to U.S. Pat. No. 4,324,879, and which substantially consist of N,N,N-tris-(6-isocyanatohexyl)isocyanurate mixed with secondary amounts of its higher homologues. Particularly preferred are polyisocyanates based on hexamethylene diisocyanate corresponding to the cited criteria and displaying mixtures of uretdione and/or isocyanurate groups, as are produced by catalytic oligomerisation of hexamethylene diisocyanate using trialkyl phosphanes. The last-named mixtures having a viscosity at 23° C. of 50 to 20,000 mPa·s and an NCO functionality of between 2.0 and 5.0 are particularly preferred.

The aromatic polyisocyanates which are likewise suitable for use according to the invention, preferably however in combination with the aforementioned aliphatic polyisocyanates, are in particular "paint polyisocyanates" based on 2,4-diisocyanatotoluene or technical mixtures thereof with 2,6-diisocyanatotoluene or based on 4,4-diisocyanatodiphenyl methane or mixtures thereof with its isomers and/or higher homologues. Such aromatic paint polyisocyanates are for example the isocyanates having urethane groups, such as are obtained by reaction of excess amounts of 2,4-diisocyanatotoluene with polyhydric alcohols such as trimethylol propane and possibly subsequent removal by distillation of the unreacted excess diisocyanate. Other aromatic paint polyisocyanates are, for example, the trimers of the monomeric diisocyanates cited by way of example, i.e. the corresponding isocyanatoisocyanurates, which subsequently to their preparation may have been freed from excess monomeric diisocyanates, preferably by distillation. In the mixtures of aromatic and (cyclo)aliphatic isocyanates, the amounts of these two components are chosen to ensure that the isocyanate groups in the prepolymer are exclusively or at least 90% (cyclo)aliphatically bonded.

Furthermore, the polyisocyanate component A can consist of any mixtures of the polyisocyanates cited by way of example.

The mass fraction of structural units in the polyurethane resin derived from the polyisocyanates A is generally approximately 10% to 50%, preferably 20% to 35%, based on the mass of the polyurethane resin.

The polyols B preferably have a number-average molar mass $M_n$ of 400 g/mol to 5000 g/mol, in particular 800 g/mol to 2000 g/mol. Their hydroxyl value is generally 30 mg/g to 280 mg/g, preferably 40 mg/g to 200 mg/g and in particular 50 mg/g to 160 mg/g. Difunctional polyols B are preferably used exclusively; up to 5% of the mass of the polyols B may also be replaced by trihydric or polyhydric polyols, however.

The hydroxyl value is defined according to DIN 53 240 as the quotient of the mass $m_{KOH}$ of potassium hydroxide which displays exactly the same number of hydroxyl groups as a sample to be examined, and the mass $m_B$ of this sample (mass of solid matter in the sample in the case of solutions or dispersions); its conventional unit is "mg/g".

Examples of such polyols, which are the compounds known from polyurethane chemistry, are polyether polyols, polyester polyols, polycarbonate polyols, polyesteramide polyols, polyamidoamide polyols, epoxy resin polyols and their reaction products with $CO_2$, polyacrylate polyols and the like. Such polyols, which can also be used mixed together, are described for example in the DE laid-open applications 20 20 905, 23 14 513 and 31 24 784 and in EP-A 0 120 466. Castor oil can also be used as the polyol component.

Of these polyols, the polyether and polyester polyols are preferred, particularly those which display only terminal OH groups and have a functionality of less than 3, preferably of 2.8 to 2 and in particular of 2.

Examples of polyether polyols which can be cited here are polyoxyethylene polyols, polyoxypropylene polyols, polyoxybutylene polyols and preferably polytetrahydrofurans having terminal OH groups.

The polyester polyols which are particularly preferred according to the invention are the known polycondensates of organic di- and optionally poly- (tri-, tetra-) hydroxy compounds and di- and optionally poly-(tri-, tetra-) carboxylic acids or hydroxycarboxylic acids or lactones. The corresponding polycarboxylic anhydrides or corresponding polycarboxylic acid esters of low alcohols can also be used in place of the free polycarboxylic acids to prepare the polyesters. Examples of suitable diols are ethylene glycol, 1,2-butanediol, diethylene glycol, triethylene glycol, polyalkylene glycols, such as polyethylene glycol, also 1,2- and 1,3-propanediol, 1,4-butanediol, 1,6-hexanediol, neopentyl glycol or hydroxypivalic acid neopentyl glycol ester. Trimethylol propane, trimethylol ethane, glycerol, erythritol, pentaerythritol, ditrimethylol propane, dipentaerythritol, trimethylol benzene or trishydroxyethyl isocyanurate can be cited here as examples of polyols having three or more hydroxyl groups in the molecule which can optionally additionally be used.

Aromatic and cycloaliphatic dicarboxylic acids, linear and branched alkyl and alkenyl dicarboxylic acids and dimer fatty acids are suitable as dicarboxylic acids. Examples include: phthalic acid, isophthalic acid, terephthalic acid, tetrahydrophthalic acid, hexahydrophthalic acid, cyclohexane dicarboxylic acid, adipic acid, succinic acid, azelaic acid, sebacic acid, glutaric acid, chlorendic acid, tetrachlorophthalic acid, maleic acid, fumaric acid, itaconic acid, malonic acid, suberic acid, 2-methylsuccinic acid, 3,3-diethyl glutaric acid, 2,2-dimethylsuccinic acid, octenylsuccinic acid and dodecenylsuccinic acid. Anhydrides of these acids, where they exist, can also be used. The expression "acid" here includes the anhydrides. Secondary amounts (amount of substance fractions of up to 10%, based on the amount of substance of all acids) of monocarboxylic acids, such as benzoic acid and hexanecarboxylic acid can also be used. Saturated aliphatic or aromatic acids are preferred, such as adipic acid or isophthalic acid. Trimellitic acid, trimesic acid, pyromellitic acid and polyanhydrides, as described in DE-A 28 11 913, or mixtures of two or more of such compounds, are cited here as polycarboxylic acids that can optionally additionally be used in smaller amounts.

The hydroxycarboxylic acids which can be used as reaction partners in the preparation of a polyester polyol having terminal hydroxyl groups are, for example, hydroxycaproic acid, hydroxybutyric acid, hydroxydecanoic acid, hydroxystearic acid. Suitable lactones which can be used in the synthesis of the polyester polyols include inter alia caprolactone, butyrolactone and valerolactone.

The mass fraction of structural units in the polyurethane resin derived from component B is conventionally between 15% and 80%, preferably between 40% and 60%, based on the mass of the polyurethane resin.

The low molar mass polyols C which are optionally used in the synthesis of the polyurethane resins usually lead to a stiffening of the polymer chain. They generally have a molar mass of approximately 60 g/mol to 400 g/mol, preferably 60 g/mol to 200 g/mol, and hydroxyl values of 200 mg/g to 1500 mg/g. They can contain aliphatic, alicyclic or aromatic groups. Their mass fraction, if they are used, is generally 0.5% to 20%, preferably 1% to 10%, based on the mass of the hydroxyl group-containing components B to D. The low molar mass polyols having up to about 20 carbon atoms per molecule are suitable for example, e.g. ethylene glycol, diethylene glycol, 1,2-propanediol, 1,3-propanediol, 1,4-butanediol, 1,2- and 1,3-butylene glycol, 1,2- and 1,4-cyclohexanediol, 1,4-cyclohexane dimethanol, 1,6-hexanediol, bisphenol A (2,2-bis-(4-hydroxyphenyl)propane), hydrogenated bisphenol A (2,2-bis-(4-hydroxycyclohexyl)propane) and mixtures thereof, and trimethylol ethane and propane as triols. Diols are preferably used exclusively or at least predominantly (generally more than 90% of the mass, preferably more than 95%).

If trifunctional or polyfunctional compounds are used for compounds A, B and/or C, it is important to prevent any gelation during synthesis of the prepolymer. This can be prevented by using monofunctional compounds together with the trifunctional or polyfunctional compounds, for example, wherein the amount of monofunctional compounds is then preferably chosen such that the average functionality of the component in question does not exceed 2.3, preferably 2.2 and in particular 2.1.

The anionogenic compounds D contain at least one, preferably at least two groups which react with isocyanates, such as hydroxyl, amino and mercaptan groups, and at least one acid group which forms anions when at least partially neutralised in aqueous solution or dispersion. Such compounds are described for example in U.S. Pat. Nos. 3,412,054 and 3,640,924 and in the DE laid-open specifications 26 24 442 and 27 44 544, to which reference is made here. Particularly suitable for this purpose are polyols, preferably diols, which contain at least one carboxyl group, generally 1 to 3 carboxyl groups, per molecule. Sulfonic acid groups or phosphonic acid groups are also suitable as groups which are capable of anion formation. Examples of compounds D are in particular dihydroxycarboxylic acids, such as α,α-dialkylol alkanoic acids, in particular α,α-dimethylol alkanoic acids such as 2,2-dimethylol acetic acid, 2,2-dimethylol propionic acid, 2,2-dimethylol butyric acid, 2,2-dimethylol pentanoic acid and the isomeric tartaric acids, also polyhydroxy acids such as gluconic acid. Of these, 2,2-dimethylol propionic acid is particularly preferred. Compounds D containing amino groups are for example 2,5-diaminovaleric acid (ornithine) and 2,4-diaminotoluene sulfonic acid-(5). Mixtures of the cited compounds D can also be used. The mass fraction of the structural units in the polyurethane resin derived from component D is generally 2% to 20%, preferably 4% to 10%, based on the mass of the polyurethane resin.

The compounds E are predominantly, preferably to an extent of from 70% to 90%, located at the chain ends of the molecules and terminate them (chain terminators). Suitable polyols have at least three, preferably 3 or 4 hydroxyl groups in the molecule. Examples which are cited here are glycerol, hexanetriol, pentaerythritol, dipentaerythritol, diglycerol, trimethylol ethane and trimethylol propane, the last of these being preferred. As a chain terminator, component E is used in excess, in other words in an amount such that the number of hydroxyl groups in the amount of component E that is used is greater than that of the isocyanate groups still present in the prepolymer ABCD. The mass fraction of structural units in the polyurethane resin derived from component E is conventionally between 2% and 15%, preferably 5% and 15%, based on the mass of the polyurethane resin. The structural units derived from component E are optionally mixed together with the structural units derived from G and/or H in the polyurethane resin.

The compounds G are monofunctional compounds which react with NCO groups, such as monoamines, in particular monosecondary amines, or monoalcohols. The following examples are cited here: methylamine, ethylamine, n-propylamine, n-butylamine, n-octylamine, laurylamine, stearylamine, isononyloxypropylamine, dimethylamine, diethylamine, di-n- and diisopropylamine, di-n-butylamine, N-methylaminopropylamine, diethyl- and dimethylaminopropylamine, morpholine, piperidine or suitably substituted derivatives thereof, amidoamines of diprimary amines and monocarboxylic acids, and monoketimines of diprimary amines, and primary/tertiary amines, such as N,N-dimethylaminopropylamine.

Compounds containing active hydrogen of differing reactivity towards NCO groups are preferably also suitable for G, in particular such compounds which in addition to a primary amino group also have secondary amino groups, or which in addition to an OH group also have COOH groups or which in addition to an amino group (primary or secondary) also contain OH groups, the latter being particularly preferred. Examples of these are: primary/secondary amines, such as 3-amino-1-methylaminopropane, 3-amino-1-ethylaminopropane, 3-amino-1-cyclohexylaminopropane, 3-amino-1-methylaminobutane; monohydroxycarboxylic acids, such as hydroxyacetic acid, lactic acid or malic acid, also alkanolamines such as N-aminoethyl ethanolamine, ethanolamine, 3-aminopropanol, neopentanolamine and particularly preferably diethanolamine. Compounds G can optionally also be used which in addition to the groups reactive to isocyanate groups also contain olefinic double bonds. The polyurethanes obtained in this way can be crosslinked after being applied to a substrate through exposure to high-energy radiation such as UV rays or electron beams.

In this way, just as with the use of compounds E, additional functional groups can be incorporated into the polymeric end product, making it more reactive towards curing agents, if this is desired. The mass fraction of structural units in the polyurethane resin derived from component G is conventionally between 2% and 20%, preferably 3% and 10%, based on the mass of the polyurethane resin.

The compounds H are the so-called chain extenders. Suitable examples are the preferably difunctional compounds known for this purpose which react with NCO groups and are not identical to B, C, D, E, F and G and which mostly have a number-average molar mass of up to 400 g/mol. Water, diamines such as ethylene diamine, 1,3-diaminopropane, 1,4-diaminobutane, hexamethylene diamine are cited here by way of example, wherein the amines can also carry substituents such as OH groups. Such polyamines are described in the DE laid-open specification 36 44 371, for example. The mass fraction of structural units in the polyurethane resin derived from component H is conventionally between 1% and 10%, preferably 2% and 5%, based on the mass of the polyurethane resin.

Crosslinking agents I may be diamines I1 which react during physical drying with the carbonyl groups in the polyurethane resin to form Schiff bases. Dihydrazides I2 of dicarboxylic acids, particularly of aliphatic dicarboxylic acids preferably having 2 to 40 carbon atoms, such as oxalic acid, malonic acid, succinic acid, adipic acid or dimeric fatty acids, are likewise suitable.

Preparation of the polyurethane resin according to the invention is preferably carried out by first preparing a polyurethane prepolymer, containing on average at least 1.7, preferably 2 to 2.5, free isocyanate groups per molecule, from the polyisocyanates A, the polyols according to B, the compounds F and optionally the low molar mass polyols C and the compounds D, then reacting this prepolymer with compounds E and/or G, optionally in mixture with small amounts of compounds H, in a non-aqueous system, wherein component E is used in stoichiometric excess (the number of hydroxyl groups in E is greater than the number of isocyanate groups in the prepolymer prepared in the first step), and the fully reacted polyurethane resin is preferably then neutralised and converted to the aqueous system. The reaction with G can optionally also be performed after conversion to the aqueous system. The prepolymer should already be of a high molar mass, preferably having a Staudinger Index $J_0$ of at least 11 cm$^3$/g, preferably of at least 13 cm$^3$/g and particularly preferably of at least 18 cm$^3$/g.

Preparation of the polyurethane prepolymer in the first step is performed by known methods. The polyfunctional isocyanate A is used in excess based on the polyols B to D to produce an intermediate with free isocyanate groups. These isocyanate groups are terminal and/or lateral, preferably terminal. The amount of polyisocyanate A here is conveniently such that the ratio of the number of isocyanate groups in the amount of component A that is used to the total number of OH groups in the polyols B to D that are used is from 1.05 to 1.4, preferably from 1.1 to 1.3.

The reaction to prepare the prepolymer is normally performed at temperatures of 55° C. to 95° C., preferably 60° C. to 75° C., depending on the reactivity of the isocyanate used, generally without the presence of a catalyst, but preferably in the presence of solvents which are inert with respect to isocyanates. Suitable examples are in particular solvents that are compatible with water, such as the ethers, ketones and esters cited below and N-methyl pyrrolidone. The mass fraction of this solvent conveniently does not exceed 30% and is preferably in the range of from 5% to 20%, relative in each case to the total of the masses of polyurethane resin and solvent. The polyisocyanate is conveniently added to the solution of the other components. It is also possible, however, to add the polyisocyanate A to the polyol B, the compounds F and optionally C, in the first step and to react the prepolymer ABFC produced in this way with component D, which is dissolved in a solvent that is inert to isocyanates, preferably N-methylpyrrolidone or ketones, to give the prepolymer ABFCD.

The prepolymer ABFCD or its solution is then reacted with the compounds according to E and/or G, optionally mixed with H, wherein the temperature is conveniently in the range from 50° C. to 160° C., preferably between 70° C. and 140° C., until the NCO content in the reaction mixture has fallen practically to zero. If the compound E is used, it is added in excess (the number of hydroxyl groups in E exceeds the number of isocyanate groups in the prepolymer ABFCD). The amount of E here is advantageously such that the ratio of the number of NCO groups in the prepolymer ABFCD or the prepolymer ABFCD(G/H), which has previously optionally already been reacted with compounds according to G and/or H, to the number of reactive groups in E is from 1:1.05 to 1:5, preferably from 1:1 to 1:3. The mass of G and/or H here can be from 0% to 90%, preferably from 2% to 20%, based on the mass of E.

A part of the (non-neutralised) acid groups bound in the polyurethane prepared in this way, preferably 5% to 30%, can optionally be reacted with difunctional acid-group-reactive compounds, such as diepoxides.

Tertiary amines, e.g. trialkylamines having 1 to 12, preferably 1 to 6, C atoms in each alkyl radical, are particularly suitable for neutralising the resulting polyurethane, which preferably contains COOH groups. Examples of these are trimethylamine, triethylamine, methyl diethylamine, tripropylamine. The alkyl radicals can also carry hydroxyl groups, for example, as in the case of the dialkyl monoalkanol, alkyl dialkanol, and trialkanol amines. One example hereof is dimethyl ethanolamine, which is preferably used as the neutralising agent.

If chain extension is performed in the organic phase, or if neutralisation and chain extension are made conjointly with dispersion in a single step, inorganic bases such as ammonia or sodium or potassium hydroxide can optionally also be used as neutralising agents.

The neutralising agent is mostly used in amounts such that the ratio of the amount of amino groups or hydroxyl ions formed in aqueous solution to the amount of acid groups in the prepolymer is approximately 0.3:1 to 1.3:1, preferably approximately 0.5:1 to 1:1.

Neutralisation, which generally takes place between room temperature and 110° C., can be performed by any means, e.g. in such a way that the hydrous neutralising agent is added to the polyurethane resin or vice versa. It is also possible, however, to add the neutralising agent to the polyurethane resin first and only then the water. A mass fraction of solids in the dispersion of from 20% to 70%, preferably from 30% to 50%, is generally obtained in this way.

The polyurethane resin according to the invention is suitable for the formulation of aqueous coating compounds as the sole binder or also in combination with other binders such as the conventional non-self crosslinking polyurethane resins or other aqueous physically drying binders or binders which are crosslinked by the addition of curing agents which are active at room temperature or elevated temperature. The mass fraction of the polyurethane resin according to the invention in the aqueous coating compound is generally from 5% to 40%, preferably from 15% to 30%, based on the total mass of the coating compound.

Where the polyurethane resin according to the invention is used as the sole binder, it is likewise possible to use curing agents such as polyfunctional isocyanates (curing at room temperature or slightly elevated temperature) to increase the curing speed. Formulation as a stoving one-pack binder with amino resins or blocked isocyanates as curing agents is also possible and advantageous.

In the formulation of aqueous coating compounds, conventional auxiliary substances and additives as known in paint technology are incorporated into the aqueous dispersion of the polyurethane resin. These include, for example, antifoam agents, levelling agents, pigments and dispersing agents for pigment dispersion.

The coating compounds according to the invention obtained in this way are suitable for virtually all applications in which solvent-containing, solvent-free or other types of aqueous paint and coating systems having a premium range of properties are used today, wherein the substrates to be coated may be metals, mineral materials, such as lime, cement or gypsum, fibre-cement building materials, concrete, wood or wood-based materials, paper, asphalt, bitumen, plastics of various types, textiles or leather. The metal substrates in all cases are preferably cars.

The invention is explained in the examples below. Here as in the foregoing text, unless otherwise stated all values with the unit "%" denote mass fractions (quotient of the mass of the substance concerned and the mass of the mixture in cg/g). Concentrations given in "%" are mass fractions of the dissolved substance in the solution (mass of the dissolved substance divided by the mass of the solution in cg/g).

EXAMPLE 1

Polyester Diol 322 g of dimer fatty acid (Pripol® 1009), 1199 g of 1,6-hexanediol, 740.4 g of adipic acid, 446.3 g of isophthalic acid and 91.5 g of trimethylol propane were placed in a 4 l three-necked flask with packed column and heated to 100° C. The reactants melted during this process. 0.5 g of dibutyl tin oxide was added at this temperature, the mixture was heated further until distillation began at approximately 150° C. Distillation was continued with the temperature rising to 220° C. until the acid value of the resin was less than 10 mg/g. The pressure in the reaction vessel was then reduced to approximately 100 hPa (approx. 100 mbar) and held at this level until the acid value was less than 2 mg/g. A viscous resin with a hydroxyl value of approximately 113 mg/g and a Staudinger Index (measured in chloroform) of approximately 9.6 cm$^3$/g was obtained.

EXAMPLE 2

Polycarbonate Diol 493 g of diethylene glycol and 1084 g of 1,6-hexanediol were placed in a 2-litre three-necked flask with packed column and heated under a nitrogen atmosphere to 150° C. 1.3 g of tetraisopropyl titanate were added at this temperature under protective gas and the mixture was then heated further to 200° C. At a constant temperature 1091 g of dimethyl carbonate were added below the surface of the mixture. The rate of addition here was adjusted in such a way that the temperature at the top of the column did not exceed 62.5° C. On completion of the addition the temperature was held at 200° C. for a further hour. The product temperature was then reduced to 180° C. and held for a further hour under reduced pressure of approximately 100 hPa (approx. 100 mbar). A viscous resin with a hydroxyl value of 170 mg/g was obtained.

EXAMPLE 3

Self-Crosslinking Polyester Urethane Dispersion 192.6 g of the polyester diol of Example 1, 30.7 g of dimethylol propionic acid and 37.7 g of 3-acetyl-1-propanol were placed in a 2-litre three-necked flask with reflux condenser and metering device and mixed homogeneously at 120° C. 51.6 g of toluylene diisocyanate were metered into this homogeneous mixture in such a way that the product temperature never exceeded 124° C. At the end of this addition, stirring was continued at from 115° C. to 120° C. until the mass fraction of free isocyanate groups was less than 0.04%. 63.4 g of isophorone diisocyanate were then added and the temperature was again held at 115° C. to 120° C. until the mass fraction of free isocyanates had once more fallen below 0.04%. After cooling the resin to 95° C., a solution of 11.7 g of ammonia water (25% in aqueous solution) in 480 g of deionised water at a temperature of from 70° C. to 80° C. was added over thirty minutes during dispersing the resin. After an additional stirring phase of one hour at 80° C., 26 g of adipic acid dihydrazide were added and likewise stirred in for 30 minutes. After cooling to room temperature and filtering through a 25 μm nonwoven filter, a fine-particle dispersion (particle size approx. 35 nm) was obtained with a mass fraction of solids of 42%, an acid value of approx. 15 mg/g, an amine value of approx. 8.5 mg/g, a dynamic viscosity of approx. 360 mPa·s and a pH of 7.4, measured in a dispersion with a mass fraction of solids of 10%.

EXAMPLE 4

Self-Crosslinking High Molar Mass Polyester Urethane Dispersion 192.6 g of the polyester diol of Example 1, 30.7 g of dimethylol propionic acid and 37.7 g of 3-acetyl-1-propanol were placed in a 2-litre three-necked flask with reflux condenser and metering device and mixed homogeneously at 120° C. 51.6 g of toluylene diisocyanate were metered into this homogeneous mixture in such a way that the product temperature never exceeded 124° C. At the end of this addition, stirring was continued at from 115° C. to 120° C. until the mass fraction of free isocyanate groups was less than 0.04%. 78.4 g of isophorone diisocyanate were then added and the temperature was again held at 115° C. to 120° C. until the mass fraction of free isocyanates was once more 0.6%. After cooling the resin to 95° C., 17.4 g of triethylamine were added and the mixture was stirred for fifteen minutes. The resin was dispersed over approximately ten minutes with 727 g of deionised water at a temperature of from 70° C. to 80° C. After an additional stirring phase of a further ten minutes at 70° C. to 80° C., a solution of 1.57 g of ethylene diamine in 23.2 g of deionised water was added and the mixture was stirred. After an additional stirring phase of one hour, 26 g of adipic acid dihydrazide were added and likewise stirred in for 30 minutes. After cooling to room temperature and filtering through a 25 μm nonwoven filter, a fine-particle dispersion (particle size approx. 24 nm) was obtained with a mass fraction of solids of 34%, an acid value of approx. 12.5 mg/g, an amine value of approx. 10.3 mg/g, a dynamic viscosity of approx. 93 mPa·s and a pH of 7.9, measured in a dispersion with a mass fraction of solids of 10%.

EXAMPLE 5

Self-Crosslinking Polycarbonate Urethane Dispersion 184.5 g of the polycarbonate diol of Example 2, 14.3 g of dimethylol propionic acid, 4 g of trimethylol propane and 33.6 g of 3-acetyl-1-propanol were placed in a 2-litre three-necked flask with reflux condenser and metering device and mixed homogeneously at 120° C. 95.3 g of hexamethylene diisocyanate were metered into this homogeneous mixture in such a way that the product temperature never exceeded 124° C. At the end of this addition, stirring was continued at 115° C. to 120° C. until the mass fraction of free isocyanate groups was less than 0.04%. After cooling the resin to 95° C., 5.7 g of dimethyl ethanolamine were added and stirred in for twenty minutes. The resin was dispersed over 30 to 45 minutes with 280 g of deionised water at a temperature of from 70° C. to 80° C. After an additional stirring phase of twenty minutes at from 70° C. to 80° C., 23.2 g of adipic acid dihydrazide were added and likewise stirred in for 30 minutes. After cooling to room temperature and filtering through a 25 μm nonwoven filter, a fine-particle dispersion (particle size approx. 66 nm) was obtained with a mass fraction of solids of 41%, an acid value of approx. 7.4 mg/g, an amine value of approx. 6.4 mg/g, a dynamic viscosity of approx. 840 mPa·s and a pH of 7.8, measured in a dispersion with a mass fraction of solids of 10%.

EXAMPLE 6

Self-Crosslinking Oil-Based Polyurethane Dispersion 90 g of castor oil, 18.2 g of dimethylol propionic acid, 22.3 g of 3-acetyl-1-propanol and 13.4 g of N-methyl pyrrolidone were placed in a 1-litre three-necked flask with reflux condenser and metering device and mixed homogeneously at 120° C. 30.5 g of toluylene diisocyanate were metered into this homogeneous mixture in such a way that the product temperature never exceeded 124° C. At the end of this addition, stirring was continued at 115° C. to 120° C. until the mass fraction of free isocyanate groups was less than 0.04%. 37.5 g of isophorone diisocyanate were then added and the temperature was again held at 115° C. to 120° C. until the mass fraction of free isocyanates was once more 0.6%. After cooling the resin to 95° C., a solution of 6.9 g of ammonia water (25% in aqueous solution) in 292 g of deionised water at a temperature of 70° C. to 80° C. was added over 30 to 45 minutes, dispersing the resin. After an additional stirring phase of thirty minutes at 70° C. to 80° C., 15.4 g of adipic acid dihydrazide were added and likewise stirred in for thirty minutes. After cooling to room temperature and filtering through a 25 μm nonwoven filter, a fine-particle dispersion (particle size approx. 124 nm) was obtained with a mass fraction of solids of 33.5%, an acid value of approx. 15.2 mg/g, an amine value of approx. 8.4 mg/g, a dynamic viscosity of approx. 6500 mPa·s and a pH of 7.0, measured in a dispersion with a mass fraction of solids of 10%.

For the purposes of comparison, a polyester urethane dispersion was prepared which was grafted with acrylic monomers containing ketone groups and which likewise contained adipic acid dihydrazide as crosslinking agent:

EXAMPLE 7

Comparison 232.0 g of a polyester, prepared from hexanediol-1,6, isophthalic acid and adipic acid, with a hydroxyl value of 88 mg/g and an acid value of less than 2 mg/g, were heated with 23.0 g of dimethylol propionic acid, 10.9 g of hexanediol-1,6 and 82.8 g of N-methylpyrrolidone-2 to 90° C. 73.9 g of isophorone diisocyanate were then metered in over a period of 25 to 30 minutes while stirring. After a further sixty minutes, 80.0 g of methyl methacrylate and 0.2 g of 2,6-di-tert-butyl-4-methyl phenol were quickly added at a temperature of 90° C. and the mixture was homogenised. 41.3 g of isophorone diisocyanate were then added over a period of ten minutes, the mixture was stirred at 90° C. until the mass fraction of free isocyanate groups was 1.11%, based on the mass of the reaction mixture. 18.9 g of 2-hydroxyethyl methacrylate were introduced into the prepolymer solution thus obtained. The reaction was continued until no further free isocyanate groups could be detected. After adding a further 37.3 g of methyl methacrylate, 16.0 g of diacetone acrylamide and 11.4 g of dimethyl ethanolamine, 658.0 g of water at a temperature of 70° C. were added to the prepolymer solution with intensive stirring. 0.7 g of tert-butyl hydroperoxide (as an 80% solution) were then quickly added dropwise at a temperature of 80° C. After a further thirty minutes a solution of 1.3 g of ascorbic acid and 130.0 g of water was metered in over a period of ninety minutes.

The resulting polyurethane-acrylic hybrid dispersion was cooled to room temperature (23° C.) and filtered through a 5 μm filter cloth. 8.2 g of adipic acid dihydrazide, dissolved in 100 g of water, were then added with stirring. The dispersion had a mass fraction of solids of 36% and a pH of 7.5.

TABLE 1

Comparison of application properties

| | Dispersion of Example 6 | Dispersion of Example 7 (comparison) |
|---|---|---|
| Mass fraction of solids: | approx. 34% | approx. 36% |

TABLE 1-continued

Comparison of application properties

| | Dispersion of Example 6 | Dispersion of Example 7 (comparison) |
|---|---|---|
| Testing on glass, 150 µm wet film | | |
| Dust-free Drying Time* | 20 min | 30 min |
| Tack-free Drying Time+ | 60 min | 55 min |
| Film | OK | OK |
| Pendulum hardness to DIN EN ISO 1522 | | |
| after 24 hours/RT | 70 s | 50 s |
| after 1 week/RT | 125 s | 90 s |
| Resistance on glass after 96 h/RT | | |
| Acetone | 15 s | 15 s |
| Ethanol | 65 s | 20 s |
| DI water | 6 hours | 10 min |

*Dust-free Drying Time: Determined as the time after application of the paint from which, when the paint surface is brushed with a clean dry fingertip, without pressure, no trace is left
+Tack-free Drying Time (wood paints): Determined as the time after application of the paint from which, when the paint surface is pressed lightly with a clean dry fingertip, no trace is left
RT: Room temperature (20° C.)
DI water: Deionised water
Film: OK means that no irregularities such as specks, haze, etc. were detectable to the naked eye

The invention claimed is:

1. A self-crosslinking aqueous polyurethane dispersion containing a crosslinking agent I selected from diamines I1 and dihydrazides I2 and polyurethanes with structural units derived from polyisocyanates A, polyols B having a number-average molar mass $M_n$ of at least 400 g/mol, compounds D having at least two groups which are reactive towards isocyanates and at least one group which is capable of anion formation, low molar mass polyols E carrying no further groups which are reactive towards isocyanate groups, compounds F containing at least one group which is reactive towards isocyanate and at least one carbonyl group said compounds F being selected from the group consisting of 1-(4-hydroxyphenyl)-3-butanone, 2-acetyl-1-ethanol, 3-acetyl-1-propanol, 4-acetyl-1-butanol, and dihydro-5-hydroxymethyl-2(3H)-furanone, and compounds G which are monofunctional with respect to isocyanates or contain active hydrogen of differing reactivity and which differ from compounds E.

2. The self-crosslinking aqueous polyurethane dispersion of claim 1, characterised in that the polyurethanes additionally contain structural units derived from low molar mass polyols C having a $M_n$ of less than 400 g/mol.

3. The self-crosslinking aqueous polyurethane dispersion of claim 1, characterised in that the polyurethanes additionally contain structural units derived from compounds H, which differ from B, C, D, E, F and G and contain at least two groups which react with NCO groups.

4. The self-crosslinking aqueous polyurethane dispersion of claim 1, characterised in that dihydrazides of aliphatic dicarboxylic acids are used as crosslinking agents.

5. A process for preparing self-crosslinking aqueous polyurethane dispersions according to claim 1, characterised in that a polyurethane prepolymer, containing on average at least 1.7 free isocyanate groups per molecule, is first prepared from polyisocyanates A, polyols according to B, compounds F and compounds D, this prepolymer is then reacted with compounds E and/or G, in a non-aqueous system, wherein component E is used in an amount such that the number of hydroxyl groups in E is greater than the number of isocyanate groups in the prepolymer prepared in the first step, and the fully reacted polyurethane resin is then neutralised and converted to the aqueous system.

6. The process of claim 5, characterised in that a polyurethane prepolymer having a Staudinger Index of at least 11 cm$^3$/g is prepared in the first step.

7. Aqueous self-crosslinking coating compounds containing the self-crosslinking aqueous polyurethane dispersions of claim 1.

8. The aqueous self-crosslinking coating compounds of claim 7, characterised in that they additionally contain curing agents selected from blocked isocyanates and amino resins.

9. A process for preparing self-crosslinking aqueous polyurethane dispersions according to claim 2, characterised in that a polyurethane prepolymer, containing on average at least 1.7 free isocyanate groups per molecule, is first prepared from polyisocyanates A, polyols according to B, compounds F and the low molar mass polyols C and compounds D, this prepolymer is then reacted with compounds E and/or G, in a non-aqueous system, wherein component E is used in an amount such that the number of hydroxyl groups in E is greater than the number of isocyanate groups in the prepolymer prepared in the first step, and the fully reacted polyurethane resin is then neutralised and converted to the aqueous system.

10. A process for preparing self-crosslinking aqueous polyurethane dispersions according to claim 3, characterised in that a polyurethane prepolymer, containing on average at least 1.7 free isocyanate groups per molecule, is first prepared from polyisocyanates A, polyols according to B, compounds F and compounds D, this prepolymer is then reacted with compounds E and/or G, which are mixed with compounds H, in a non-aqueous system, wherein component E is used in an amount such that the number of hydroxyl groups in E is greater than the number of isocyanate groups in the prepolymer prepared in the first step, and the fully reacted polyurethane resin is then neutralised and converted to the aqueous system.

* * * * *